(12) United States Patent
Wang (10) Patent No.: US 8,279,587 B2
(45) Date of Patent: Oct. 2, 2012

(54) GENERAL-PURPOSE SOFTWARE DEFINED RADIO PLATFORM

(76) Inventor: Tao Wang, Germantown, MD (US)

( * ) Notice: Subject to any disclaimer, the term of this patent is extended or adjusted under 35 U.S.C. 154(b) by 243 days.

(21) Appl. No.: 12/900,803

(22) Filed: Oct. 8, 2010

(65) Prior Publication Data

US 2011/0096487 A1 Apr. 28, 2011

Related U.S. Application Data

(60) Provisional application No. 61/250,370, filed on Oct. 9, 2009.

(51) Int. Cl.
*G06F 1/16* (2006.01)

(52) U.S. Cl. .............. 361/679.01; 439/626; 165/104.33; 345/174; 455/579

(58) Field of Classification Search .................. 439/630, 439/607.31, 136, 636, 71, 13, 378, 626; 165/104.33, 165/56, 80.2; 345/173, 174, 175, 176, 156, 345/206, 211, 419; 361/749, 760, 752, 784, 361/810, 679.21, 679.47, 679.53, 679.58, 361/679.01, 679.31, 679.27, 679.55, 679.48, 361/679.09, 679.4, 679.43; 455/566, 90.3, 455/550.1, 575.3, 579, 108, 562.1, 150.1, 455/450

See application file for complete search history.

(56) References Cited

U.S. PATENT DOCUMENTS

2009/0147492 A1* 6/2009 Heinrichs et al. ............. 361/784
2011/0165549 A1* 7/2011 Hao .............................. 434/317

* cited by examiner

*Primary Examiner* — Hung Duong (74) *Attorney, Agent, or Firm* — Ming Chow; Sinorica, LLC (57) ABSTRACT

A flexible, compact size, low power consumption, low cost, high performance software defined radio platform that can be used in different areas, including industrial applications, amateur radio, and academic research. The present invention is a processing platform that packs a complete computer inside a pocket size enclosure. The invention makes use of a graphic user interface and touch screen LCD display for interaction with a user. Additionally, the invention is also able to use a plurality of daughter cards for transmission or receiving of radio signals including a broad range of frequencies. With a plurality of different types of ports, the present invention is versatile in its ability to communicate with other devices.

20 Claims, 14 Drawing Sheets

GENERAL-PURPOSE SOFTWARE DEFINED RADIO PLATFORM

The current application claims a priority to the U.S. Provisional Patent application Ser. No. 61/250,370 filed on Oct. 9, 2009.

SUMMARY OF THE INVENTION

This invention is to provide a flexible, compact size, low power consumption, low cost, high performance software defined radio platform that can be used in different areas, including industrial applications, amateur radio, and academic research.

DETAIL DESCRIPTIONS OF THE INVENTION

Figure 1:
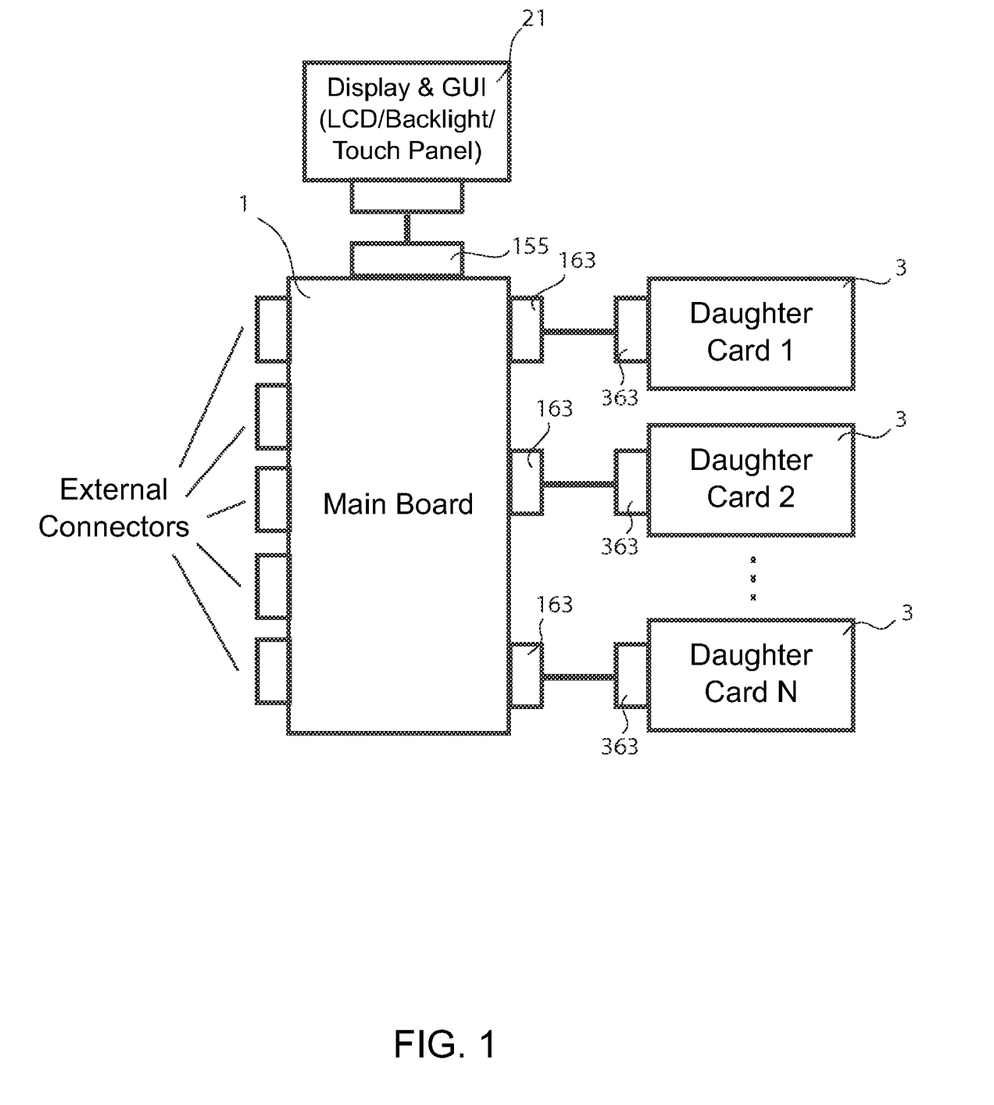
FIG. 1 is the overall block diagram of the invention.

FIG. 1 is the overall block diagram of the invention. The invention has three major components: the main board 1, the daughter card(s) 3, and the display and Graphical User Interface (GUI) 21. The three components are connected through connectors 155, 156, 157, 163, 363. Both the main board and the daughter card(s) have external connectors exposed on the enclosure for user access. The number of daughter cards inside one enclosure could be one or more than one.

Figure 2:
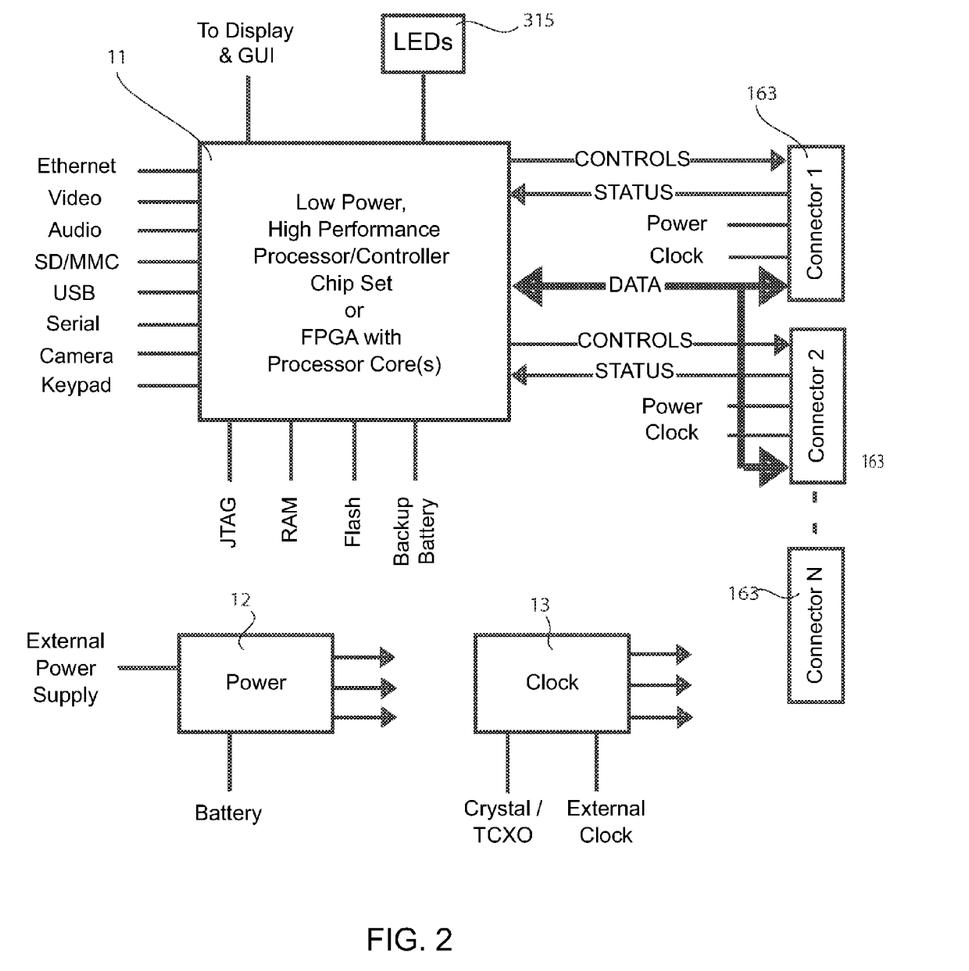
FIG. 2 is the block diagram of the main board.

FIG. 2 is the block diagram of the main board. The low power, high performance processor/controller chip set, and/or FPGA with processor core(s) 11 provide all major functions of the main board. It supports Ethernet, video, audio, SD/MMC, USB, serial, camera, and keypad ports. It also provides JTAG, RAM, Flash, and backup battery connections. The circuitry for the power supply 12 and the clock 13 is also on the main board. The main board is connected to one or more than one daughter cards through expansion connectors 163, which route control, status, data signals, as well as power and clock.

Figure 3:
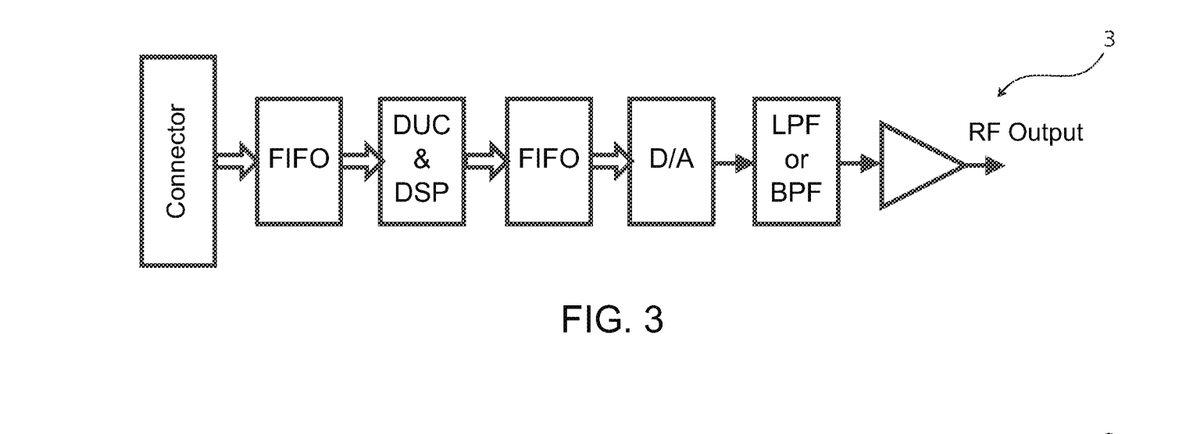
FIG. 3 is the block diagram of a typical transmit daughter card where the D/A output is not further up-converted.

FIG. 3 is the block diagram of a typical transmitting daughter card where the Digital-to-Analog converter (D/A; DAC) output is not further up-converted. During operation, the daughter card is mounted to the main board through the connector. The signal flows through the connector to a First-In-First-Out (FIFO) device, a Digital Up-Conversion (DUC) and Digital Signal Processing (DSP) unit, another FIFO device, a D/A converter, a Low-Pass Filter (LPF) or Band-Pass Filter (BPF), an amplifier, to the RF output connector(s) on the faceplate of the daughter card.

Figure 4:
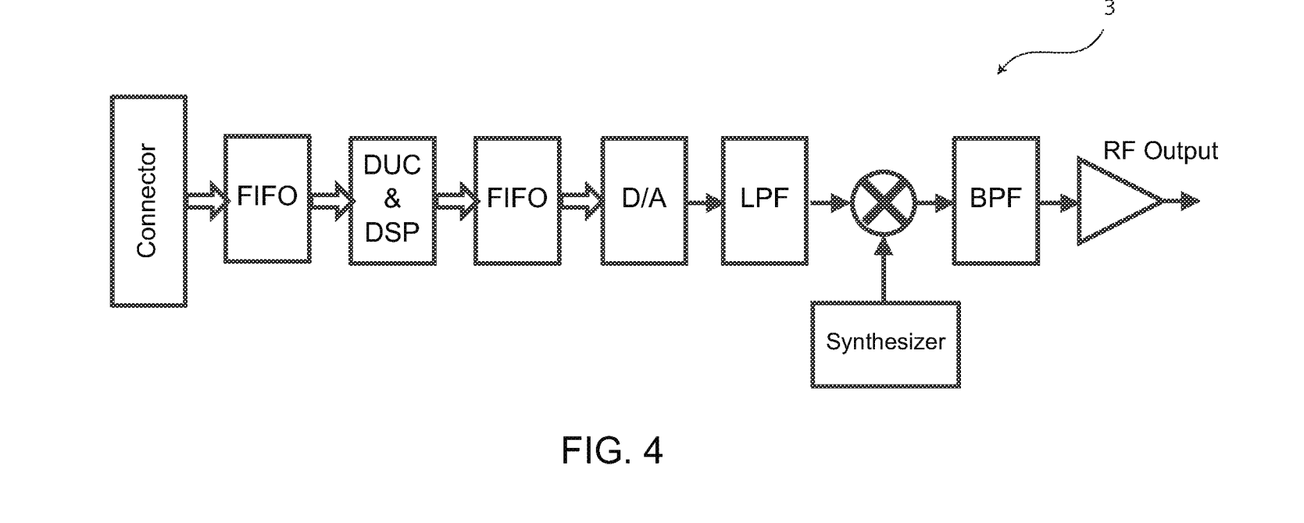
FIG. 4 is the block diagram of a typical transmit daughter card where the D/A output is further up-converted.

FIG. 4 is the block diagram of a typical transmitting daughter card where the D/A output is further up-converted. A synthesizer generates the needed local oscillator (LO) frequency for the mixer. The mixer converts the carrier frequency at the LPF output upward to a higher desired frequency.

Figure 5:
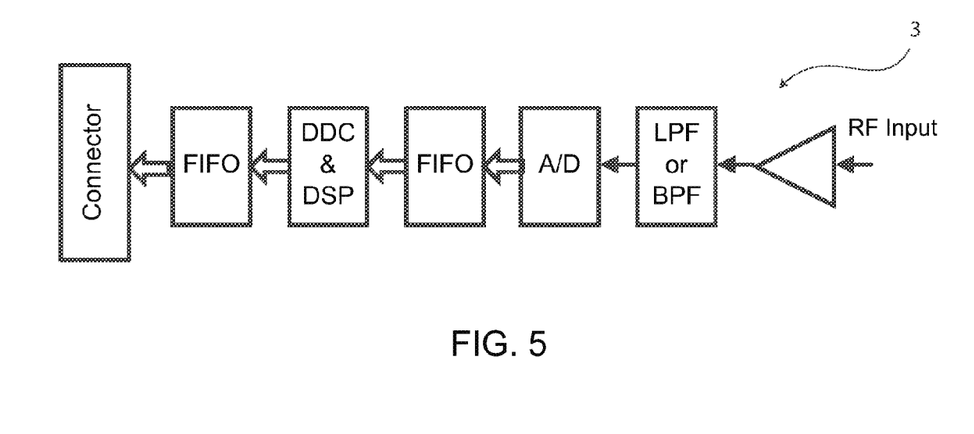
FIG. 5 is the block diagram of a typical receive daughter card where the RF input is fed into the A/D input through an LPF or BPF, without down-conversion of the frequency.

FIG. 5 is the block diagram of a typical receiving daughter card where the RF input is fed into the Analog-to-Digital converter (A/D; ADC) input without down-conversion of the frequency. During operation, the daughter card is mounted to the main board through the connector. The signal flows through RF input connector(s) on the faceplate of the daughter card to an amplifier, a LPF or BPF, an A/D converter, a FIFO device, a Digital Down-Conversion (DDC) and DSP unit, another FIFO device, to the main board through the connector.

Figure 6:
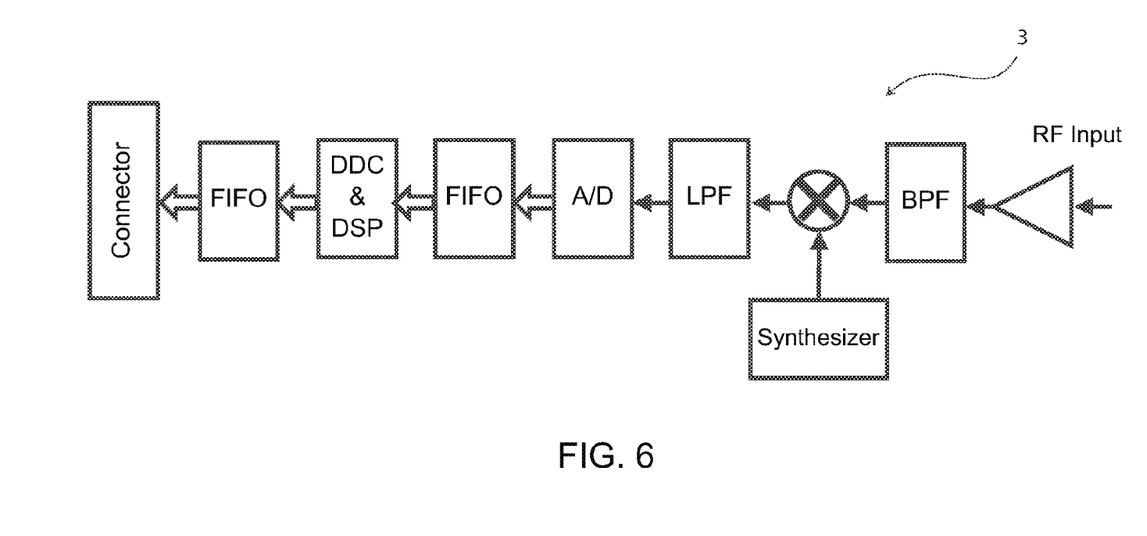
FIG. 6 is the block diagram of a typical receive daughter card where the RF input is first down-converted then fed into the A/D input through an LPF.

FIG. 6 is the block diagram of a typical receiving daughter card where the RF input is first down-converted and then fed into the A/D input. A synthesizer generates the needed LO frequency for the mixer. The mixer converts the carrier frequency at the BPF output downward to a lower desired frequency that can be processed by the A/D.

Figure 7:
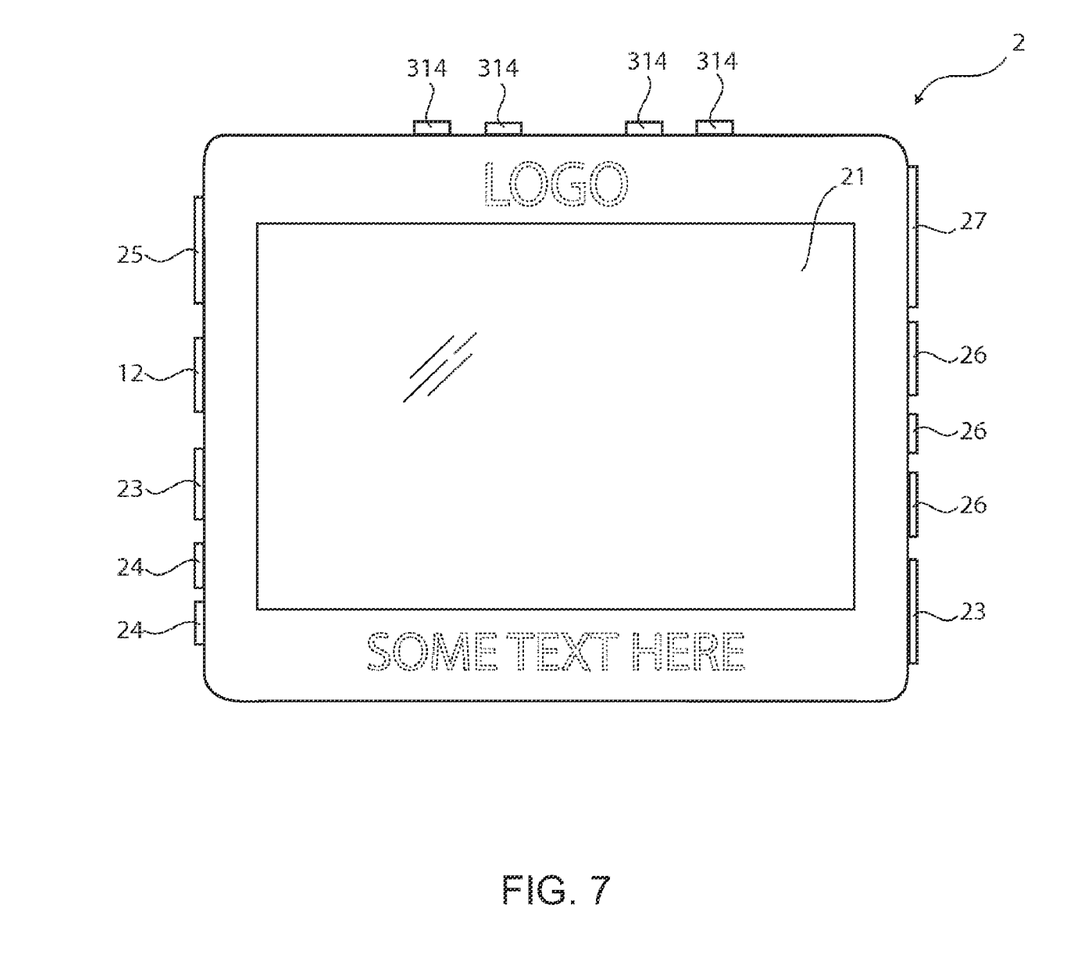
FIG. 7 is the front view of the enclosure.

FIG. 7 is the "front" view of the enclosure 2. All the circuits are inside the enclosure. The front side of the enclosure has an LCD display 21 with backlight and touch panel. This is the main human-machine interface (HMI) when the user is operating the radio using his/her fingers or a stylus directly. There are connectors 314 for RF transmitting and/or RF receiving, and connectors 22, 23, 24, 25, 26, 28, 27 for power, video, audio, network, USB, serial ports, and memory cards along the "top", "left", and "right" sides of the enclosure. Connectors on the "top" side are mounted on the daughter card(s), which is (are) mounted on the enclosure. No connectors, except a connector for the cradle, are on the "bottom" side. This makes it possible for the platform to be placed in an upright position with its "bottom" on a surface.

Figure 8:
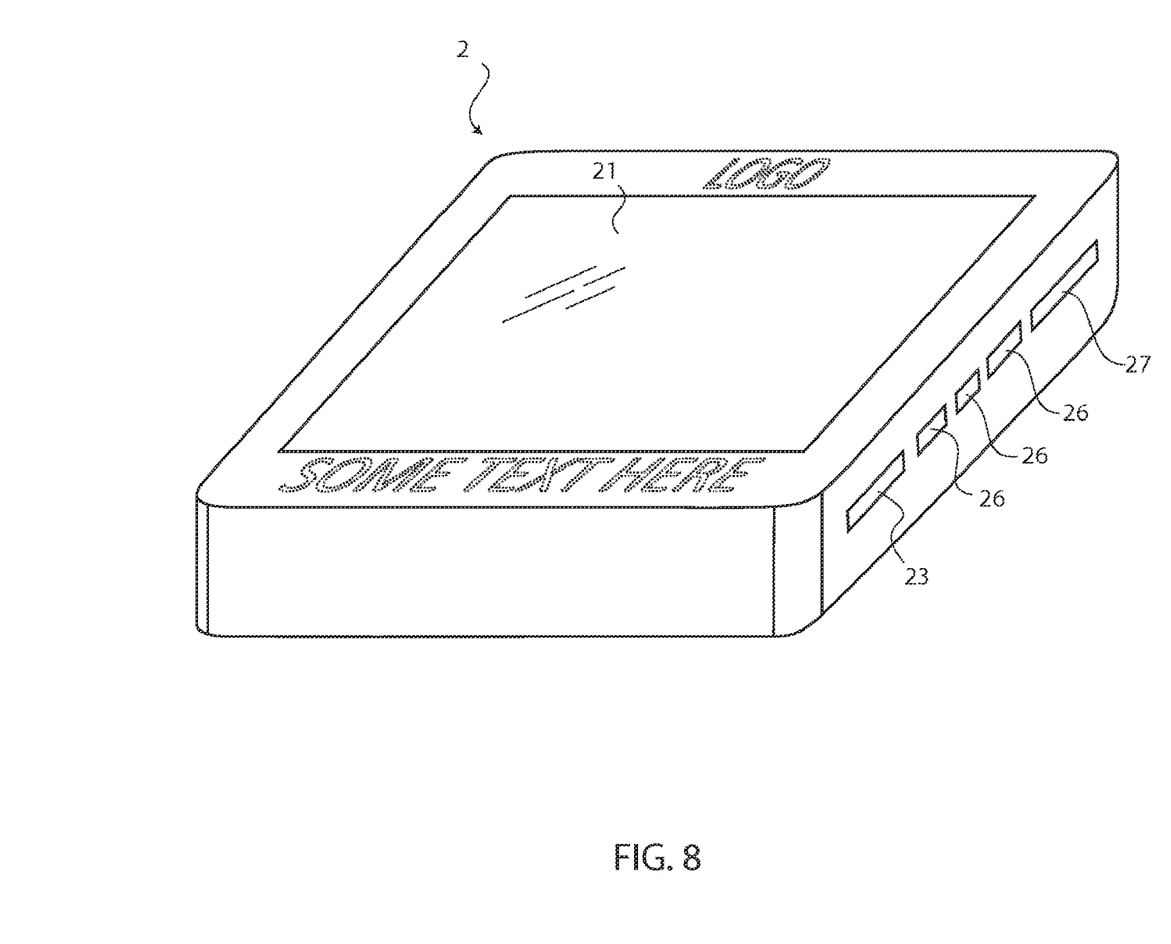
FIG. 8 is the 3D view of the enclosure.

FIG. 8 is the 3D view of the enclosure. The invention is shown with its "back" on a surface.

Figure 9:
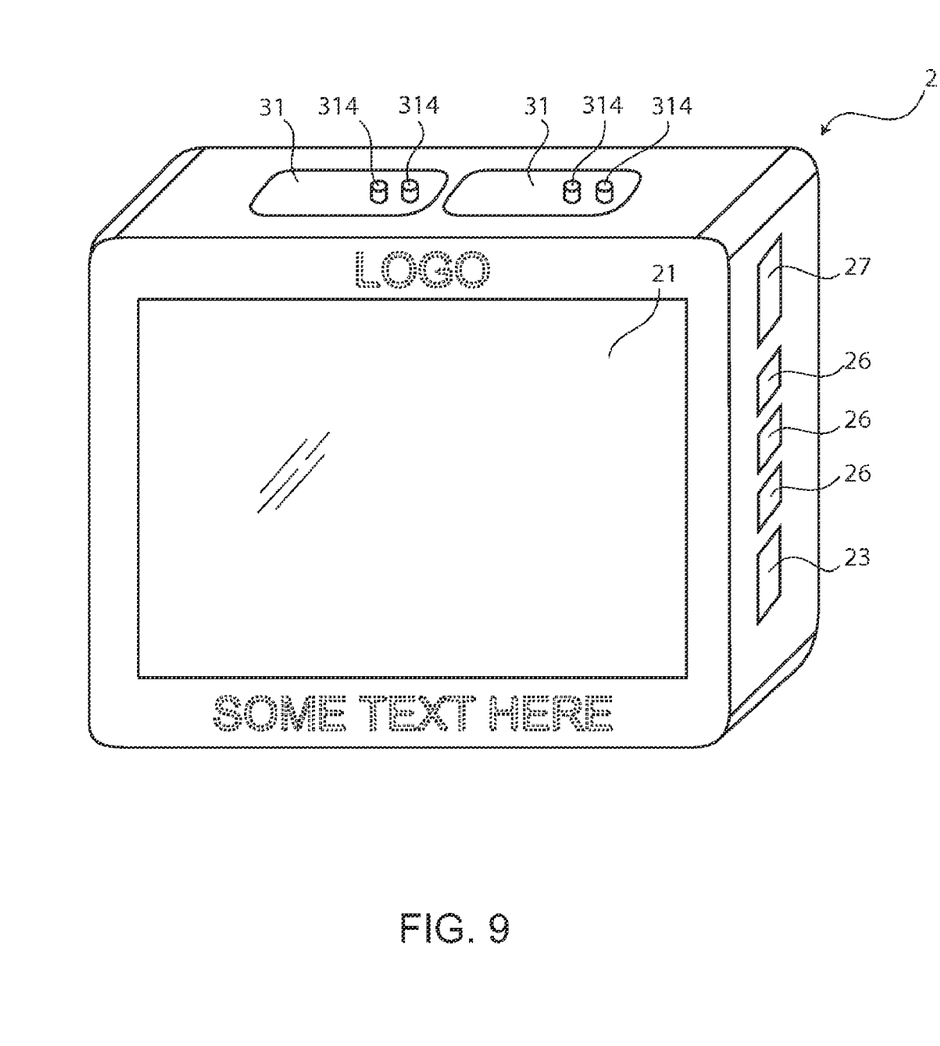
FIG. 9 is the enclosure in an upright position showing the front side.

FIG. 9 is the enclosure in an upright position showing the "front", "top", and "right" sides. On the top of the enclosure, two daughter card faceplates 31 are shown. Each of the daughter cards has one or more RF or other connectors on the faceplate.

Figure 10:
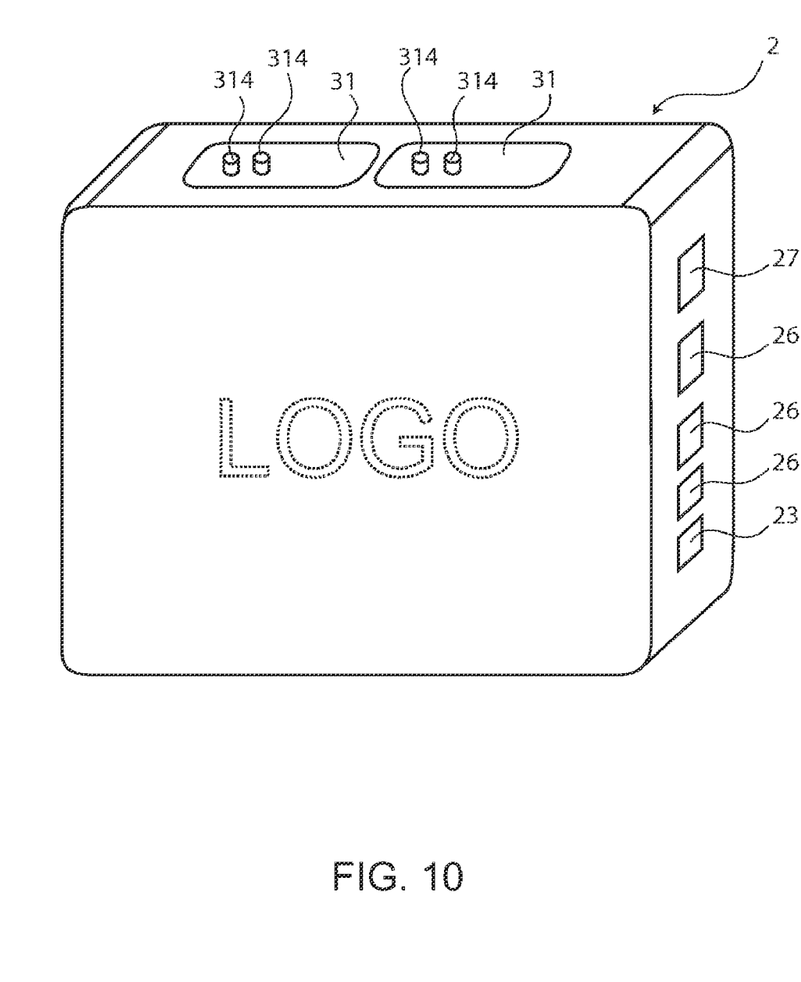
FIG. 10 is the enclosure in an upright position showing the back side.

FIG. 10 is the enclosure in an upright position showing the "back", "top", and "left" sides.

Figure 11:
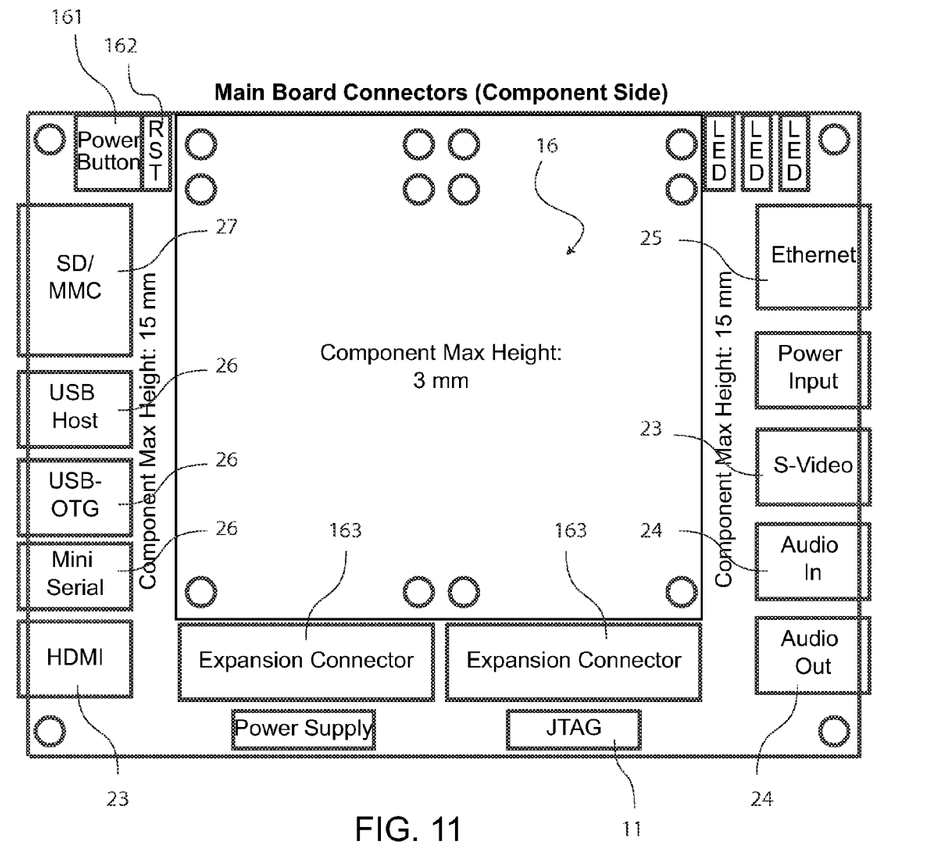
FIG. 11 is the general layout and locations of connectors of the main board component side.

FIG. 11 is the general layout and locations of connectors of the main board component side 16. Other than the connectors mentioned in FIG. 2, the main board also has a power button 161 for turning on or off the power, and a reset (RST) button 162 for resetting the circuitry. The component side of the main board faces the daughter cards. The two expansion connectors 163 are provided for daughter cards to sit on. In the central area, the component heights are restrained so that there is enough space for the daughter cards. In other areas, the maximum height of components is not restrained.

Figure 12:
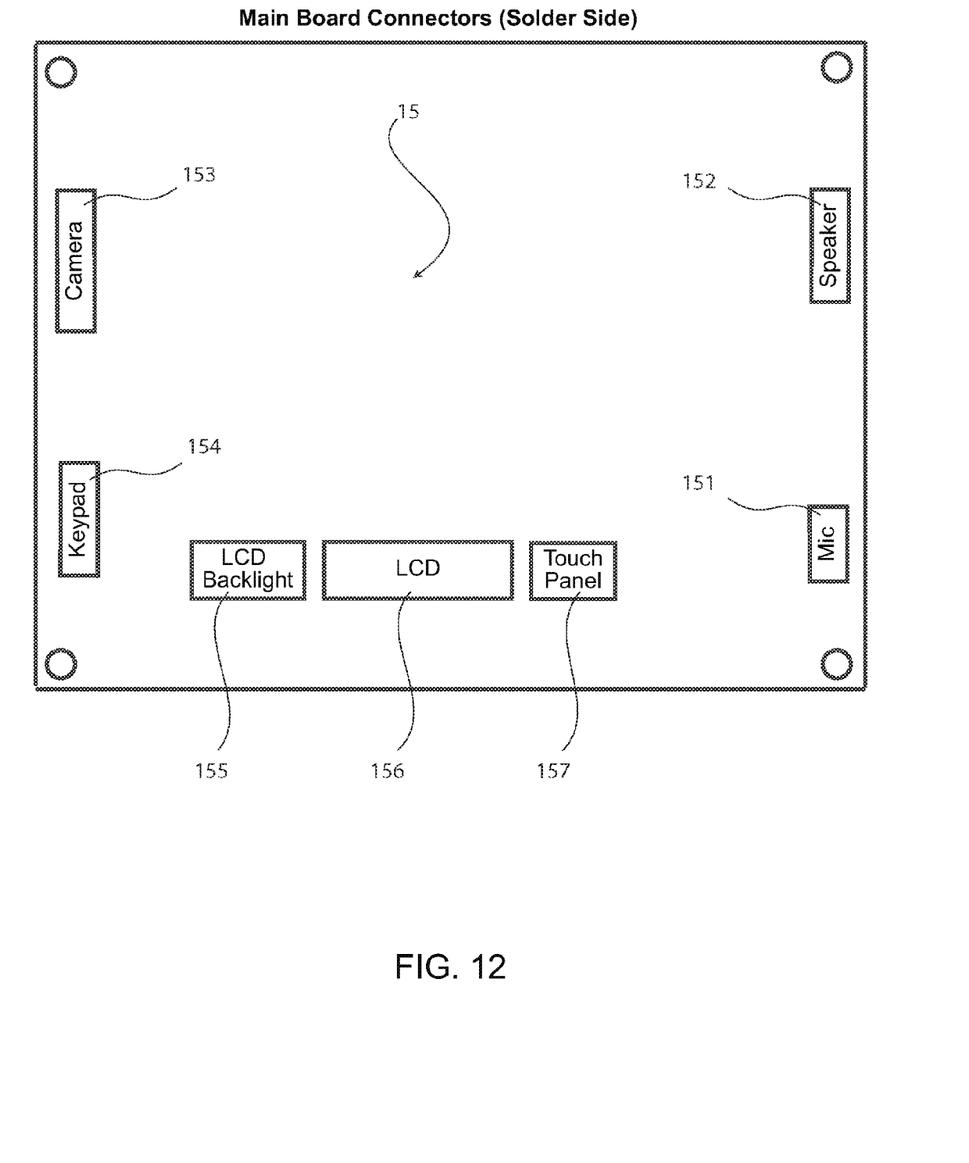
FIG. 12 is the general layout and locations of connectors of the main board solder side.

FIG. 12 is the general layout and locations of connectors on the solder side 15 of the main board. The solder side faces the LCD display and touch panel. Three connectors 155, 156, 157 are used for connecting LCD backlight, LCD, and touch panel. The solder side of the main board also provides connectors 153, 154, 152, 151 for connecting camera, keypad, internal speaker, and internal microphone.

Figure 13:
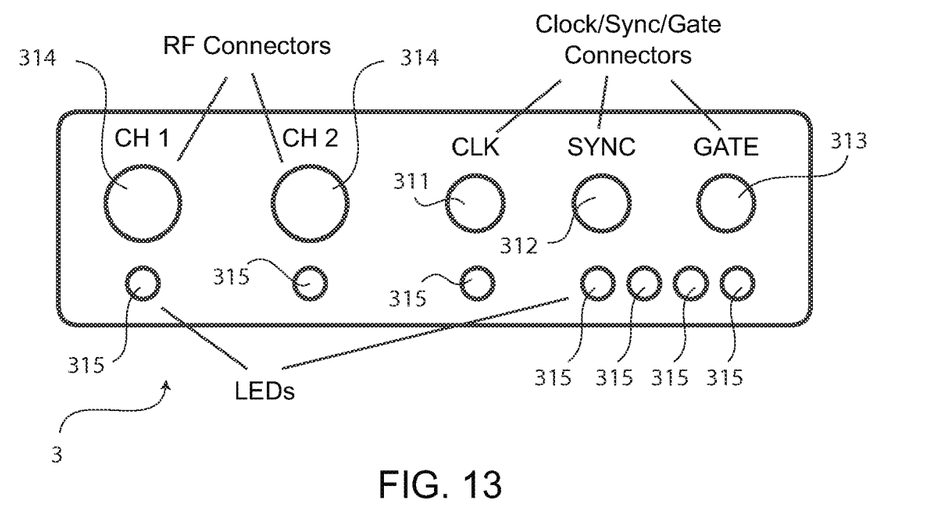
FIG. 13 is the faceplate of a typical daughter card for RF receive and/or transmit, with coaxial connectors for CLK/SYNC/GATE signals.

FIG. 13 is the faceplate of a typical daughter card for RF receiving and/or transmitting. It has connectors 314, 311, 312, 313, 315 for RF, clock (CLK), synchronization (SYNC), GATE signals, and LEDs for status of signals, power supply, and temperature. In this diagram, coaxial connectors are used for all signals. So CLK, SYNC, GATE are all in single-ended settings.

Figure 14:
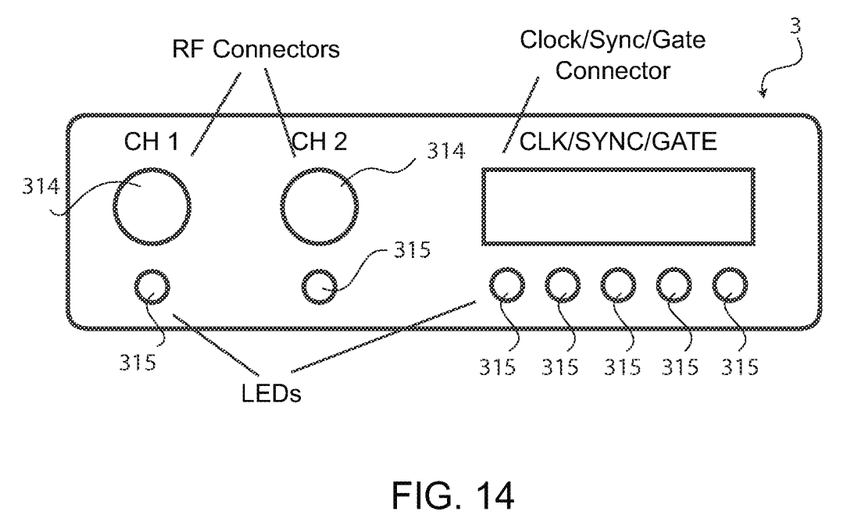
FIG. 14 is the faceplate of a typical daughter card for RF receive and/or transmit, with double-row header connectors for CLK/SYNC/GATE signals.

FIG. 14 is the faceplate of a typical daughter card for RF receiving and/or transmitting, with double-row header connectors for CLK/SYNC/GATE signals. It has connectors for RF, clock, SYNC, GATE signals, and LEDs for status of signals, power supply, and temperature. In this diagram, coaxial connectors are used for RF signals. The double-row header connectors are used for CLK, SYNC, GATE signals. The CLK, SYNC, GATE signals are all in both single-ended and Low-Voltage Differential Signaling (LVDS) settings. LVDS helps to maintain signal quality in a noisy environment.

Figure 15:
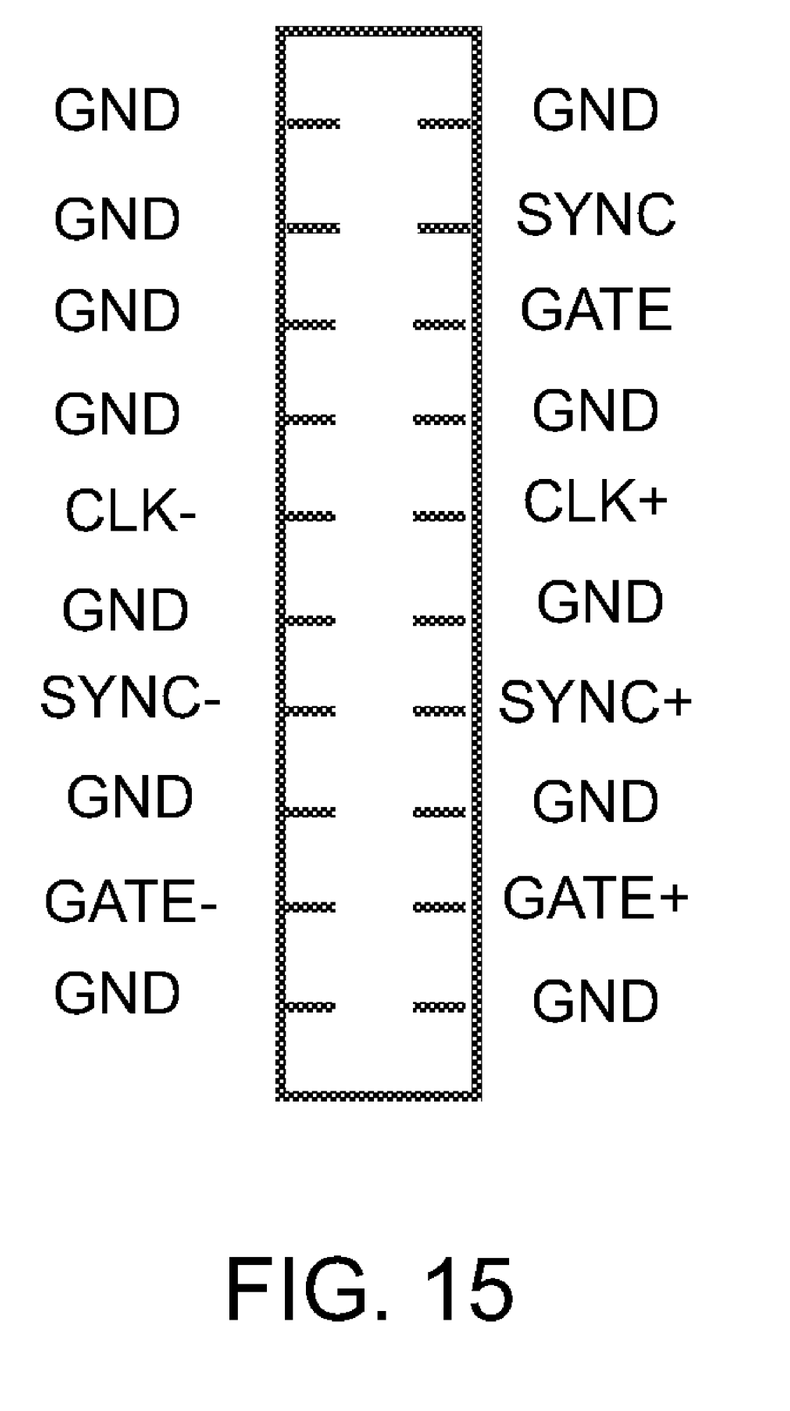
FIG. 15 is the detailed pin-out of the connector for CLK/SYNC/GATE signals in FIG. 14.

FIG. 15 is the detailed pin-out of the connector for CLK/SYNC/GATE signals in FIG. 14. It supports both the single-ended and LVDS settings for CLK, SYNC, and GATE signals. The user can select which signals to use through software.

Figure 16:
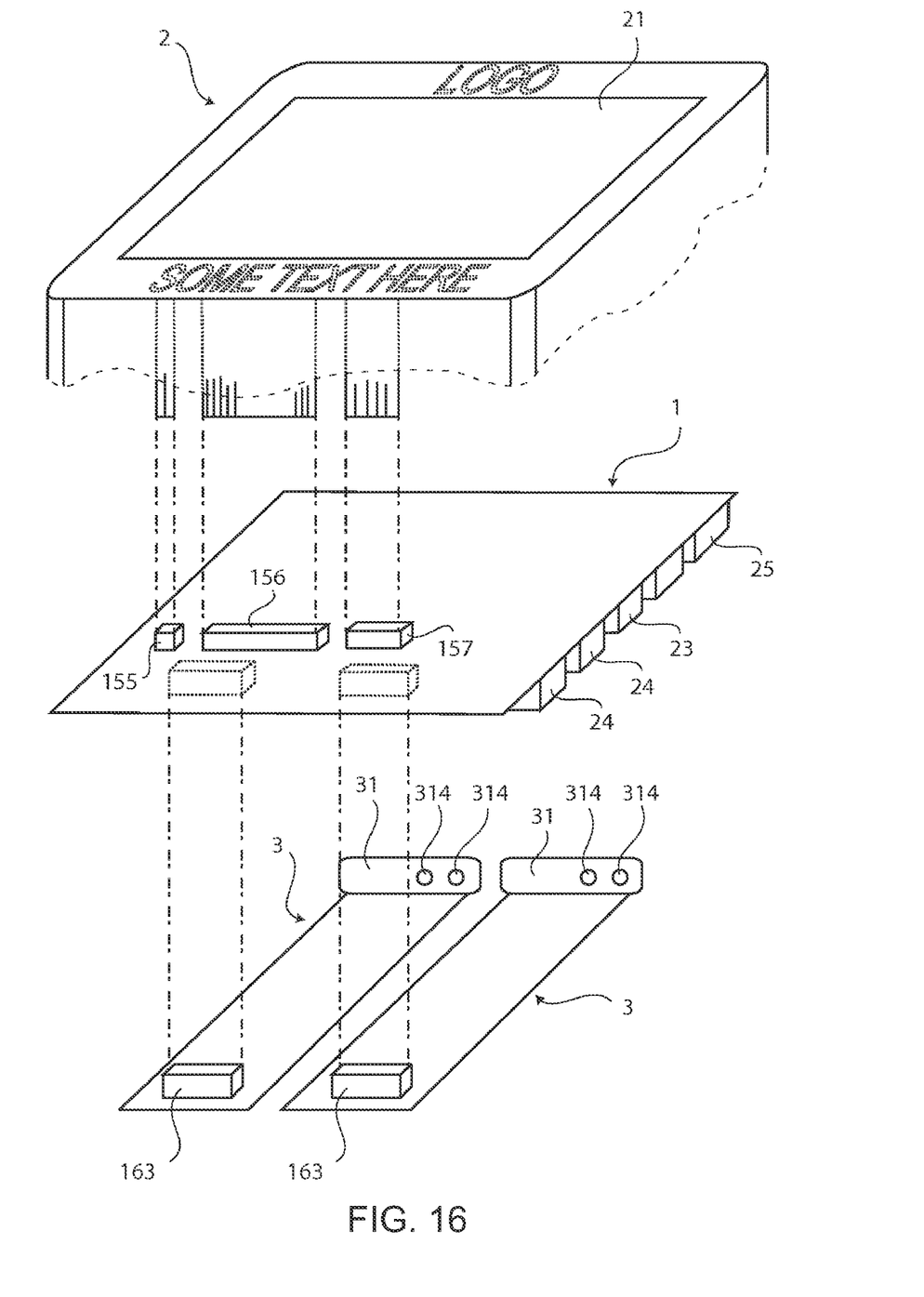
FIG. 16 is the assembly drawing showing how all parts are assembled together.

FIG. 16 is the assembly drawing showing how all parts are assembled together.

Figure 17:
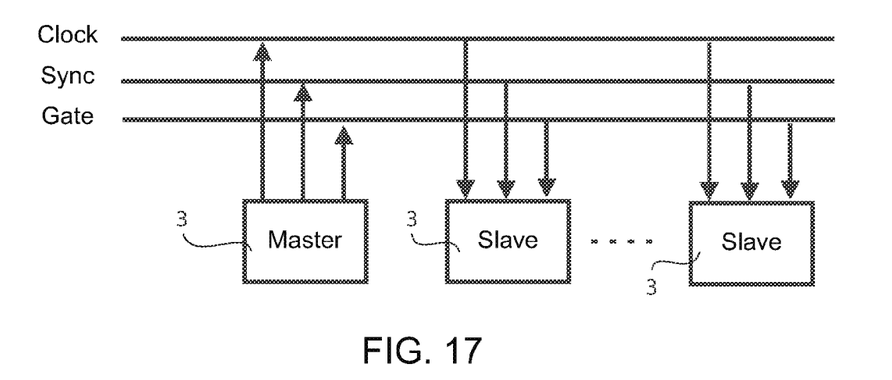
FIGS. 17-19 are three scenarios for connecting the signals of this invention in an MIMO system.
Figure 18:
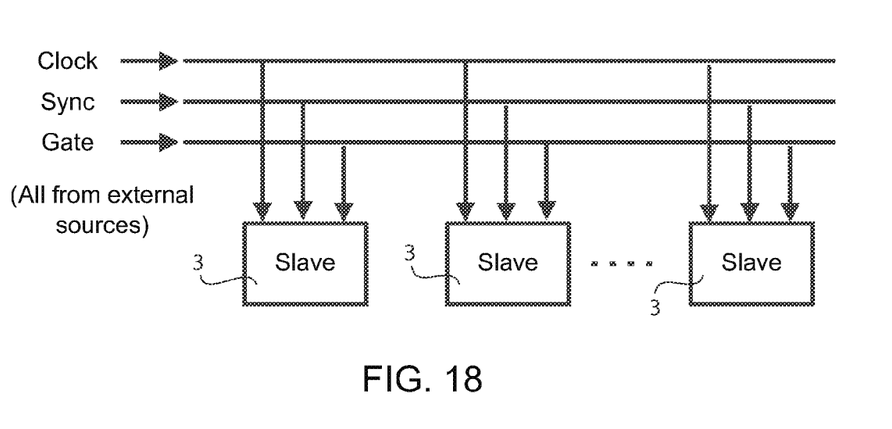
Figure 19:
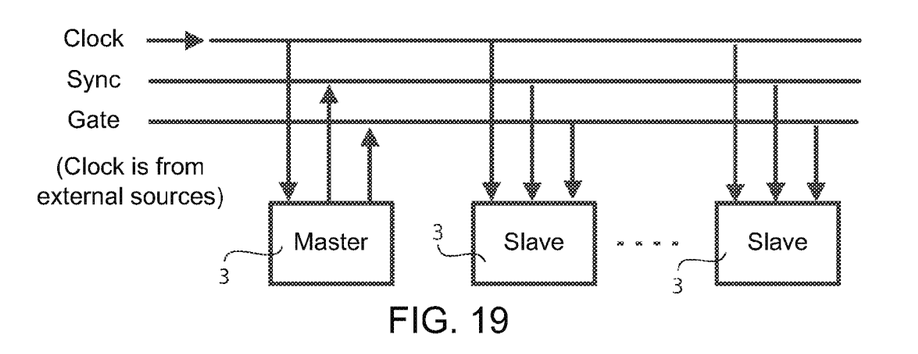

FIGS. 17-19 are three scenarios for connecting the signals of this platform in a Multiple-Input Multiple-Output (MIMO) system. Each box means a daughter card in this platform, or a compatible third-party device. The daughter cards can be all in one enclosure, or from different enclosures.

In FIG. 17, one of the daughter cards is a Master device, which provides CLK/SYNC/GATE signals. All other daughter cards are Slave devices.

In FIG. 18, all daughter cards are Slave devices, CLK/SYNC/GATE are all provided by external sources.

In FIG. 19, one of the daughter cards is a Master device, which provides SYNC/GATE signals. But the CLK is fed from an external source.

Operation

In operation, a user chooses the needed daughter card(s) and installs it (them) onto the component side of the main board by pushing the connectors in place, tightening the screws, and then closing the back cover. He can then connect the power adapter and turn on the power by pressing the Power Button 161 shown in FIG. 11.

The platform will boot itself up in several seconds and display the login screen. Once the user enters the correct username and password, he/she will be able to use the platform.

The user can use all the ports provided on the main board. This includes Ethernet, S-Video, Audio In, Audio Out, SD/MMC, USB-Host, USB-OTG, Mini Serial, and HDMI ports. The user can operate the platform using his/her fingers or a stylus through the LCD and touch panel interface. He/she can also connect a computer monitor through HDMI and a computer keyboard and mouse through the USB port.

Depending on the type of daughter cards installed, the platform will have different functions. But in general, the user can choose the band (or frequency), mode (analog and digital modes), DSP processing methods for each of the channels.

The user can transmit his voice/audio signals, as a traditional amateur radio does, or transmit recorded signals, or external digital input through mini serial, USB, or Ethernet ports.

Similarly, the user can receive audio signals, as a traditional amateur radio does, or save the received digital signal on the memory card, or route it to an external device through mini serial, USB, or Ethernet ports.

The user can use the internal clock, or synchronize the platform to an external clock source. He/she can also connect the daughter cards in either one or more platforms together to form an MIMO system.

Ramifications:

1. Processor/Controller chip set vs. FPGA with processor core(s) as the central processing/controlling device. Either way is feasible. There are low-power, high performance choices in either category that support open source embedded operating systems (e.g., Linux, Angstrom) and/or proprietary embedded operating systems (e.g., Nios II from Altera, MicroBlaze from Xilinx, Windows Mobile from Microsoft.)

2. Number of cards in one enclosure.

The enclosure can be made in different sizes, such that it can house one, two, or more daughter cards in it, depending on how many slots it supports. In cases where there are more slots than the number of cards installed, the unused slot(s) can be left vacant and a blank faceplate can be used to block the opening(s) on the enclosure for the unused slot(s).

3. Type of daughter cards.

The most typical daughter cards are transmitting cards, receiving cards, transmitting/receiving cards, GPS/Wi-Fi/UWB/Bluetooth cards, and cards that have different combination of the above-mentioned functions. For the cards with transmitting/receiving functions, there are two categories: basic frequency cards (supporting the frequency bands supported by the ADC/DACs generically), and up-down-conversion cards (where a mixer(s) is (are) used for the conversion of the received frequency to the lower frequency that the ADC can process or to convert the DAC output signal to a higher frequency for transmission.

4. Battery/power.

The platform can be powered through external power supply or internal battery.

5. Internal/External microphone/speaker.

The external microphone and speaker (or headset) can be connected to the Audio In and Audio Out ports, respectively. When there is no external microphone present, the internal microphone would be used. When there is no external speaker (or headset), the audio signal would be routed to the internal speaker.

6. Power Amplifier for transmit.

The RF signal from a transmit daughter card can be further amplified by an external third party RF power amplifier. An RF power amplifier can also be included in the daughter card to provide up to 5 Watts RF output power. It is intended to keep the total power consumption as low as possible to reduce the heat and hence not requiring a fan in the enclosure. Any power level beyond 5 Watts needs to be handled through external third party amplifiers.

7. Hardware monitoring.

The clock signals, power supplies, temperatures, input and output power levels are all monitored and accessible through software. Software can produce alarm signals in marginal operating conditions and issue automatic shutdown commands in extreme conditions.

8. The Platform as a computer.

The main board of this platform is actually powerful enough to be viewed as a general-purpose computer. Therefore, many programs/services that are offered by a regular computer are naturally supported by this platform. Examples are web server on the platform, Simple Network Management Protocol (SNMP) access to the platform, telnet/ssh, and ftp/sftp to the platform. All of these can be used to greatly enhance the functions of this platform. For example, the user can control/access the platform through a web interface using his browser, locally or remotely.

9. Application areas.

Amateur all-band all-mode radio.

Portable/hand-held spectrum analyzer/oscilloscope.

Remote unattended surveillance station with picture/video-taking capabilities.

A platform for academic community to develop and verify SDR algorithms/protocols.

A reduced-size version with all components on one board (without explicit daughter cards) at a lower cost for those who just need the basic functions.

A ruggedized version with aluminum enclosure and external mounting holes/brackets for industrial applications.

A larger enclosure which can house more than two daughter cards for those who need to process more channels or form a multi-channel MIMO system in one enclosure.

ADVANTAGES

1. The unique design of the enclosure provides superior user friendliness and operability.
2. The very small size daughter cards as part of the platform, as well as the way the cards are installed in the enclosure, provides modular design, flexibility, lower total cost of ownership.
3. The unique combination of the low power, low cost, high performance processor, LCD with touch panel, Ethernet, video, audio, SD/MMC, USB and serial ports, as well as the way the clock, reset, control, monitoring signals are designed and used, makes this platform a state-of-the-art industrial level product at a cost of the amateur level.
4. The integration of web server, SNMP, telnet/ssh, and ftp/sftp functions makes this platform a powerful one that packs a complete computer inside a pocket-size product.
5. The different levels of low power, power off, or sleep modes greatly reduces the power consumption and hence extends the battery life.
6. High processing bandwidth. Due to the use of powerful processor(s) and the close proximity between the main board and the daughter cards, as well as the protocols used, the processing bandwidth of this platform is very high. This enables the capability of processing multiple carrier signals, such as Orthogonal Frequency-Division Multiplexing (OFDM).
7. Well designed operating interfaces. Multiple interfaces are included: LCD with touch panel, serial port, USB, Ethernet, web server, SNMP, etc. The SD/MMC port can also be used to support Secure Digital Input Output (SDIO) devices.
8. The software on the main board and the FPGA code on the daughter card help make this platform a unique and powerful one that was not seen before.

What is claimed is:

1. A General-Purpose Software Defined Radio Platform comprising,
    a main board;
    an enclosure;
    at least one daughter card;
    the main board including a processor unit, a power supply, a clock circuitry, a solder side, a component side, and internal connectors;
    the component side of the main board including a power button, a reset button, and expansion connectors;
    the enclosure including of a LCD display, a cradle connector, a video connector, audio connectors, a network connector, a serial port connector, and a memory card connector;
    the at least one daughter card having of a faceplate; and
    the faceplate including of a clock connector, a synchronization connector, a gate connector, RF connectors, and LEDs.

2. The General-Purpose Software Defined Radio Platform as claimed in claim 1 comprising,
    the processor unit being connected to the internal connectors;
    the power supply being connected to the internal connectors; and
    the clock circuitry being connected to the internal connectors.

3. The General-Purpose Software Defined Radio Platform as claimed in claim 2 comprising,
    the solder side including an internal microphone, an internal speaker, a camera connector, a key pad connector, a LCD backlight connector, a LCD connector, and a touch panel connector;
    the internal microphone being connected to the internal connectors;
    the internal speaker being connected to the internal connectors;
    the camera connector being connected to the internal connectors;
    the key pad connector being connected to the internal connectors;
    the LCD backlight connector being connected to the internal connectors;
    the LCD connectors being connected to the internal connectors; and
    the touch panel connectors being connected to the internal connectors.

4. The General-Purpose Software Defined Radio Platform as claimed in claim 3 comprising,
    the LCD display including a backlight and a touch panel;
    the LCD display being connected to the LCD connector;
    the backlight being connected to the LCD backlight connector; and
    the touch panel being connected to the touch panel connector.

5. The General-Purpose Software Defined Radio Platform as claimed in claim 1 comprising,
    the enclosure having a front side, a back side, a top side, a left side, a right side, and a bottom side;
    the faceplate of the at least one daughter card being mounted to the top side;
    the LCD display being positioned on the front side;
    the video connector, the audio connectors, the network connector, the serial port connector, and the memory card connector being positioned on the left side or the right side of the enclosure; and
    the cradle connector being positioned on the bottom side.

6. The General-Purpose Software Defined Radio Platform as claimed in claim 2 comprising,
the power button being connected to the internal connectors;
the reset button being connected to the internal connectors;
the expansion connectors being connected to the internal connectors; and
the at least one daughter card being connected to the expansion connectors.

7. The General-Purpose Software Defined Radio Platform as claimed in claim 6 comprising,
the clock connector being connected to the internal connectors by means of the expansion connectors;
the synchronization connector being connected to the internal connectors by means of the expansion connectors;
the gate connector being connected to the internal connectors by means of the expansion connectors;
the RF connectors being connected to the internal connectors by means of the expansion connectors; and
the LEDs being connected to the internal connectors by means of the expansion connectors.

8. The General-Purpose Software Defined Radio Platform as claimed in claim 1 comprising,
the internal connectors being interfaces selected from the group consisting of serial interfaces, video interfaces, audio interfaces, SD/MMC interfaces, or USB interfaces;
the at least one daughter card being a card selected from the group consisting of RF transmitting cards, RF receiving cards, transmitting/receiving cards, GPS cards, Wi-Fi Cards, or UWB Cards, Bluetooth cards; and
the power supply being a power source selected from the group consisting of an external power supply and an internal battery.

9. A General-Purpose Software Defined Radio Platform comprising,
a main board;
an enclosure;
at least one daughter card;
the main board including a processor unit, a power supply, a clock circuitry, a solder side, a component side, and internal connectors;
the component side including a power button, a reset button, and expansion connectors;
the solder side including an internal microphone, an internal speaker, a camera connector, a key pad connector, a LCD backlight connector, a LCD connector, and a touch panel connector;
the enclosure including a LCD display, a cradle connector, a video connector, audio connectors, a network connector, a serial port connector, and a memory card connector;
the at least one daughter card having a faceplate;
the faceplate including a clock connector, a synchronization connector, a gate connector, RF connectors, and LEDs;
the processor unit being connected to the internal connectors;
the power supply being connected to the internal connectors; and
the clock circuitry being connected to the internal connectors.

10. The General-Purpose Software Defined Radio Platform as claimed in claim 9 comprising,
the internal microphone being connected to the internal connectors;
the internal speaker being connected to the internal connectors;
the camera connector being connected to the internal connectors;
the key pad connector being connected to the internal connectors;
the LCD backlight connector being connected to the internal connectors;
the LCD connectors being connected to the internal connectors; and
the touch panel connectors being connected to the internal connectors.

11. The General-Purpose Software Defined Radio Platform as claimed in claim 10 comprising,
the LCD display including a backlight and a touch panel;
the LCD display being connected to the LCD connector;
the backlight being connected to the to the LCD backlight connector; and
the touch panel being connected to the touch panel connector.

12. The General-Purpose Software Defined Radio Platform as claimed in claim 9 comprising,
the enclosure having a front side, a back side, a top side, a left side, a right side, and a bottom side;
the faceplate of the at least one daughter card being mounted to the top side;
the LCD display being positioned on the front side;
the video connector, the audio connectors, the network connector, the serial port connector, and the memory card connector being positioned on the left side or the right side of the enclosure; and
the cradle connector being positioned on the bottom side.

13. The General-Purpose Software Defined Radio Platform as claimed in claim 9 comprising,
the power button being connected to the internal connectors;
the reset button being connected to the internal connectors;
the expansion connectors being connected to the internal connectors; and
the at least one daughter card being connected to the expansion connectors.

14. The General-Purpose Software Defined Radio Platform as claimed in claim 9 comprising
the clock connector being connected to the internal connectors by means of the expansion connectors;
the synchronization connector being connected to the internal connectors by means of the expansion connectors;
the gate connector being connected to the internal connectors by means of the expansion connectors;
the RF connectors being connected to the internal connectors by means of the expansion connectors; and
the LEDs being connected to the internal connectors by means of the expansion connectors.

15. The General-Purpose Software Defined Radio Platform as claimed in claim 9 comprising,
the internal connectors being interfaces selected from the group consisting of serial interfaces, video interfaces, audio interfaces, SD/MMC interfaces, or USB interfaces;
the at least one daughter card being a card selected from the group consisting of RF transmitting cards, RF receiving cards, transmitting/receiving cards, GPS cards, Wi-Fi Cards, or UWB Cards, Bluetooth cards; and the power supply being a power source selected from the group consisting of an external power supply and an internal battery.

16. A General-Purpose Software Defined Radio Platform comprising, a main board;
an enclosure;
at least one daughter card;
the main board including a processor unit, a power supply, a clock circuitry, a solder side, a component side, and internal connectors;
the component side including a power button, a reset button, and expansion connectors;
the solder side including an internal microphone, an internal speaker, a camera connector, a key pad connector, a LCD backlight connector, a LCD connector, and a touch panel connector;
the enclosure including a LCD display, a cradle connector, a video connector, audio connectors, a network connector, a serial port connector, and a memory card connector;
the at least one daughter card having a faceplate;
the faceplate including a clock connector, a synchronization connector, a gate connector, RF connectors, and LEDs;
the processor unit being connected to the internal connectors;
the power supply being connected to the internal connectors;
the clock circuitry being connected to the internal connectors;
the internal microphone being connected to the internal connectors;
the internal speaker being connected to the internal connectors;
the camera connector being connected to the internal connectors;
the key pad connector being connected to the internal connectors;
the LCD backlight connector being connected to the internal connectors;
the LCD connectors being connected to the internal connectors;
the touch panel connectors being connected to the internal connectors;
the LCD display including a backlight and a touch panel;
the LCD display being connected to the LCD connector;
the backlight being connected to the to the LCD backlight connector;
the touch panel being connected to the touch panel connector; and
the internal connectors being interfaces selected from the group consisting of serial interfaces, video interfaces, audio interfaces, SD/MMC interfaces, or USB interfaces.

17. The General-Purpose Software Defined Radio Platform as claimed in claim 16 comprising, the enclosure having a front side, a back side, a top side, a left side, a right side, and a bottom side;
the faceplate of the at least one daughter card being mounted to the top side;
the LCD display being positioned on the front side;
the video connector, the audio connectors, the network connector, the serial port connector, and the memory card connector being positioned on the left side or the right side of the enclosure; and
the cradle connector being positioned on the bottom side.

18. The General-Purpose Software Defined Radio Platform as claimed in claim 16 comprising, the power button being connected to the internal connectors;
the reset button being connected to the internal connectors;
the expansion connectors being connected to the internal connectors; and
the at least one daughter card being connected to the expansion connectors.

19. The General-Purpose Software Defined Radio Platform as claimed in claim 16 comprising, the clock connector being connected to the internal connectors by means of the expansion connectors;
the synchronization connector being connected to the internal connectors by means of the expansion connectors;
the gate connector being connected to the internal connectors by means of the expansion connectors;
the RF connectors being connected to the internal connectors by means of the expansion connectors; and
the LEDs being connected to the internal connectors by means of the expansion connectors.

20. The General-Purpose Software Defined Radio Platform as claimed in claim 16 comprising, the at least one daughter card being a card selected from the group consisting of RF transmitting cards, RF receiving cards, transmitting/receiving cards, GPS cards, Wi-Fi Cards, or UWB Cards, Bluetooth cards; and
the power supply being a power source selected from the group consisting of an external power supply and an internal battery.

* * * * *